United States Patent
Lathrop et al.

(10) Patent No.: US 11,150,988 B1
(45) Date of Patent: Oct. 19, 2021

(54) METADATA PATTERN TO DETECT WRITE LOSS/INCONSISTENCIES OF OPTIMIZED-WRITE-ONCE OPERATIONS

(71) Applicant: EMC IP HOLDING COMPANY LLC, Hopkinton, MA (US)

(72) Inventors: Stephen M Lathrop, Milford, MA (US); Michael J Scharland, Franklin, MA (US); Kevin Tobin, Hopedale, MA (US)

(73) Assignee: Dell Products L.P., Hopkinton, MA (US)

(*) Notice: Subject to any disclaimer, the term of this patent is extended or adjusted under 35 U.S.C. 154(b) by 25 days.

(21) Appl. No.: 16/833,768

(22) Filed: Mar. 30, 2020

(51) Int. Cl.
*G06F 11/10* (2006.01)
*G06F 11/00* (2006.01)
*G06F 3/06* (2006.01)
*G06F 3/00* (2006.01)

(52) U.S. Cl.
CPC .......... *G06F 11/1076* (2013.01); *G06F 3/067* (2013.01); *G06F 3/0619* (2013.01); *G06F 3/0644* (2013.01); *G06F 3/0659* (2013.01)

(58) Field of Classification Search
CPC .. G06F 11/1076; G06F 3/0619; G06F 3/0644; G06F 3/0659; G06F 3/067; H03M 13/09
See application file for complete search history.

(56) References Cited

U.S. PATENT DOCUMENTS

| 7,315,976 B2* | 1/2008 | Holt | G06F 11/1076 |
| | | | 711/114 |
| 8,589,761 B2* | 11/2013 | Cronin | G06F 11/167 |
| | | | 714/763 |
| 8,910,031 B1* | 12/2014 | Liu | H03M 13/09 |
| | | | 714/807 |
| 9,471,245 B1* | 10/2016 | Shilane | G06F 11/1458 |
| 2003/0145270 A1* | 7/2003 | Holt | G11B 20/1833 |
| | | | 714/766 |
| 2010/0325519 A1* | 12/2010 | Lyon | H03M 13/15 |
| | | | 714/758 |

* cited by examiner

*Primary Examiner* — Justin R Knapp
(74) *Attorney, Agent, or Firm* — Anderson Gorecki LLP

(57) ABSTRACT

Sector signature patterns with sector signature values and sector signature parity values are embedded with data slices. A new pattern is embedded with a slice each time the slice data is updated. The patterns are selected in order such that every sector signature value and sector signature parity value changes when a new pattern is embedded. A separate metadata record such as a key is maintained to indicate which pattern has been embedded with the slice. A data integrity check is performed by comparing the embedded sector signature parity values with the metadata record and/or performing a pattern-to-key lookup.

20 Claims, 12 Drawing Sheets

Key 0

| Sector | TDAT 0 | 1 | 2 | 3 | HP |
|---|---|---|---|---|---|
| 0 | 0 | 1 | 0 | 0 | 1 |
| 1 | 0 | 1 | 0 | 0 | 1 |
| 2 | 0 | 1 | 0 | 0 | 1 |
| 3 | 0 | 1 | 0 | 0 | 1 |
| 4 | 1 | 2 | 0 | 0 | 3 |
| 5 | 1 | 2 | 0 | 0 | 3 |
| 6 | 1 | 2 | 0 | 0 | 3 |
| 7 | 1 | 2 | 0 | 0 | 3 |
| 8 | 2 | 3 | 0 | 0 | 1 |
| 9 | 2 | 3 | 0 | 0 | 1 |
| 10 | 2 | 3 | 0 | 0 | 1 |
| 11 | 2 | 3 | 0 | 0 | 1 |
| 12 | 3 | 0 | 0 | 0 | 3 |
| 13 | 3 | 0 | 0 | 0 | 3 |
| 14 | 3 | 0 | 0 | 0 | 3 |
| 15 | 3 | 0 | 0 | 0 | 3 |

Figure 5A

Key 1

| Sector | TDAT 0 | 1 | 2 | 3 | HP |
|---|---|---|---|---|---|
| 0 | 1 | 2 | 1 | 1 | 3 |
| 1 | 1 | 2 | 1 | 1 | 3 |
| 2 | 1 | 2 | 1 | 1 | 3 |
| 3 | 1 | 2 | 1 | 1 | 3 |
| 4 | 2 | 3 | 1 | 1 | 1 |
| 5 | 2 | 3 | 1 | 1 | 1 |
| 6 | 2 | 3 | 1 | 1 | 1 |
| 7 | 2 | 3 | 1 | 1 | 1 |
| 8 | 3 | 0 | 1 | 1 | 3 |
| 9 | 3 | 0 | 1 | 1 | 3 |
| 10 | 3 | 0 | 1 | 1 | 3 |
| 11 | 3 | 0 | 1 | 1 | 3 |
| 12 | 0 | 1 | 1 | 1 | 1 |
| 13 | 0 | 1 | 1 | 1 | 1 |
| 14 | 0 | 1 | 1 | 1 | 1 |
| 15 | 0 | 1 | 1 | 1 | 1 |

Figure 5B

Key 2

| Sector | TDAT 0 | 1 | 2 | 3 | HP |
|---|---|---|---|---|---|
| 0 | 2 | 3 | 2 | 2 | 1 |
| 1 | 2 | 3 | 2 | 2 | 1 |
| 2 | 2 | 3 | 2 | 2 | 1 |
| 3 | 2 | 3 | 2 | 2 | 1 |
| 4 | 3 | 0 | 2 | 2 | 3 |
| 5 | 3 | 0 | 2 | 2 | 3 |
| 6 | 3 | 0 | 2 | 2 | 3 |
| 7 | 3 | 0 | 2 | 2 | 3 |
| 8 | 0 | 1 | 2 | 2 | 1 |
| 9 | 0 | 1 | 2 | 2 | 1 |
| 10 | 0 | 1 | 2 | 2 | 1 |
| 11 | 0 | 1 | 2 | 2 | 1 |
| 12 | 1 | 2 | 2 | 2 | 3 |
| 13 | 1 | 2 | 2 | 2 | 3 |
| 14 | 1 | 2 | 2 | 2 | 3 |
| 15 | 1 | 2 | 2 | 2 | 3 |

Figure 6A

Key 3

| Sector | TDAT 0 | 1 | 2 | 3 | HP |
|---|---|---|---|---|---|
| 0 | 3 | 0 | 3 | 3 | 3 |
| 1 | 3 | 0 | 3 | 3 | 3 |
| 2 | 3 | 0 | 3 | 3 | 3 |
| 3 | 3 | 0 | 3 | 3 | 3 |
| 4 | 0 | 1 | 3 | 3 | 1 |
| 5 | 0 | 1 | 3 | 3 | 1 |
| 6 | 0 | 1 | 3 | 3 | 1 |
| 7 | 0 | 1 | 3 | 3 | 1 |
| 8 | 1 | 2 | 3 | 3 | 3 |
| 9 | 1 | 2 | 3 | 3 | 3 |
| 10 | 1 | 2 | 3 | 3 | 3 |
| 11 | 1 | 2 | 3 | 3 | 3 |
| 12 | 2 | 3 | 3 | 3 | 1 |
| 13 | 2 | 3 | 3 | 3 | 1 |
| 14 | 2 | 3 | 3 | 3 | 1 |
| 15 | 2 | 3 | 3 | 3 | 1 |

Figure 6B

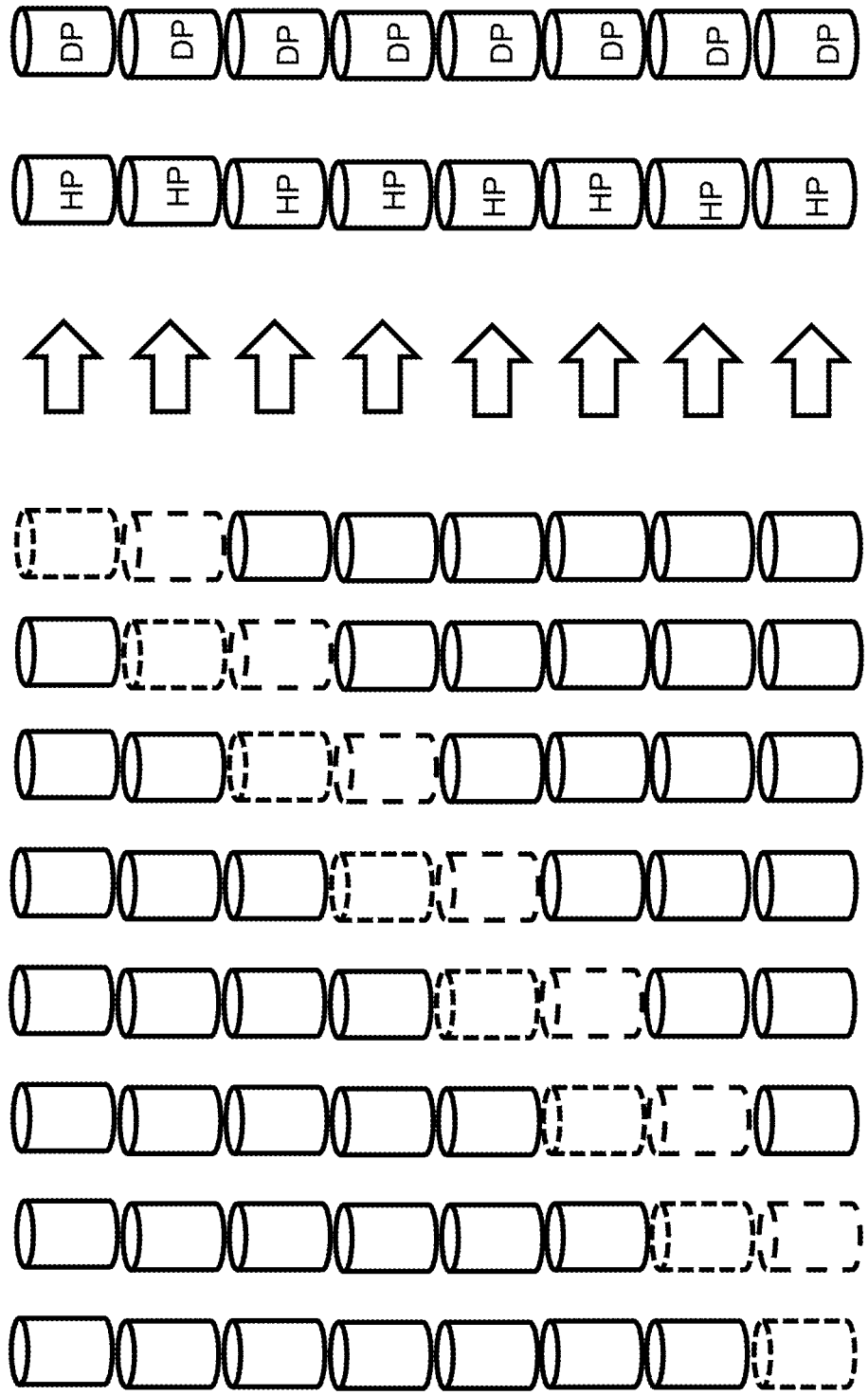

Key 0

| Sector | TDAT | 1 | 2 | 3 | 4 | 5 | 6 | 7 | HP |
|---|---|---|---|---|---|---|---|---|---|
| 0 | 0 | 1 | 0 | 0 | 0 | 0 | 0 | 0 | 1 |
| 1 | 0 | 1 | 0 | 0 | 0 | 0 | 0 | 0 | 1 |
| 2 | 0 | 1 | 0 | 0 | 0 | 0 | 0 | 0 | 1 |
| 3 | 0 | 1 | 0 | 0 | 0 | 0 | 0 | 0 | 1 |
| 4 | 1 | 2 | 0 | 0 | 0 | 0 | 0 | 0 | 3 |
| 5 | 1 | 2 | 0 | 0 | 0 | 0 | 0 | 0 | 3 |
| 6 | 1 | 2 | 0 | 0 | 0 | 0 | 0 | 0 | 3 |
| 7 | 1 | 3 | 0 | 0 | 0 | 0 | 0 | 0 | 3 |
| 8 | 2 | 3 | 0 | 0 | 0 | 0 | 0 | 0 | 1 |
| 9 | 2 | 3 | 0 | 0 | 0 | 0 | 0 | 0 | 1 |
| 10 | 2 | 0 | 0 | 0 | 0 | 0 | 0 | 0 | 1 |
| 11 | 3 | 0 | 0 | 0 | 0 | 0 | 0 | 0 | 3 |
| 12 | 3 | 0 | 0 | 0 | 0 | 0 | 0 | 0 | 3 |
| 13 | 3 | 0 | 0 | 0 | 0 | 0 | 0 | 0 | 3 |
| 14 | 3 | 0 | 0 | 0 | 0 | 0 | 0 | 0 | 3 |
| 15 | 3 | 0 | 1 | 0 | 0 | 0 | 1 | 0 | 3 |

| Spec Diag DP Sector | 0 |
|---|---|
| 0 | 1 |
| 1 | 1 |
| 2 | 1 |
| 3 | 1 |
| 4 | 1 |
| 5 | 3 |
| 6 | 3 |
| 7 | 3 |
| 8 | 0 |
| 9 | 1 |
| 10 | 1 |
| 11 | 0 |
| 12 | 3 |
| 13 | 3 |
| 14 | 3 |
| 15 | 3 |

Figure 8

Key 1

| Sector | TDAT 0 | 1 | 2 | 3 | 4 | 5 | 6 | 7 | HP |
|---|---|---|---|---|---|---|---|---|---|
| 0 | 1 | 2 | 1 | 1 | 1 | 1 | 1 | 1 | 3 |
| 1 | 1 | 2 | 1 | 1 | 1 | 1 | 1 | 1 | 3 |
| 2 | 1 | 2 | 1 | 1 | 1 | 1 | 1 | 1 | 3 |
| 3 | 1 | 2 | 1 | 1 | 1 | 1 | 1 | 1 | 3 |
| 4 | 2 | 3 | 1 | 1 | 1 | 1 | 1 | 1 | 1 |
| 5 | 2 | 3 | 1 | 1 | 1 | 1 | 1 | 1 | 1 |
| 6 | 2 | 3 | 1 | 1 | 1 | 1 | 1 | 1 | 1 |
| 7 | 2 | 3 | 1 | 1 | 1 | 1 | 1 | 1 | 1 |
| 8 | 3 | 0 | 1 | 1 | 1 | 1 | 1 | 1 | 3 |
| 9 | 3 | 0 | 1 | 1 | 1 | 1 | 1 | 1 | 3 |
| 10 | 3 | 0 | 1 | 1 | 1 | 1 | 1 | 1 | 3 |
| 11 | 3 | 0 | 1 | 1 | 1 | 1 | 1 | 1 | 3 |
| 12 | 0 | 1 | 1 | 1 | 1 | 1 | 1 | 1 | 1 |
| 13 | 0 | 1 | 1 | 1 | 1 | 1 | 1 | 1 | 1 |
| 14 | 0 | 1 | 1 | 1 | 1 | 1 | 1 | 1 | 1 |
| 15 | 0 | 1 | 2 | 1 | 1 | 1 | 2 | 1 | 1 |

| Spec Diag DP Sector | 1 |
|---|---|
| 0 | 3 |
| 1 | 3 |
| 2 | 3 |
| 3 | 3 |
| 4 | 3 |
| 5 | 1 |
| 6 | 1 |
| 7 | 0 |
| 8 | 1 |
| 9 | 2 |
| 10 | 2 |
| 11 | 2 |
| 12 | 1 |
| 13 | 0 |
| 14 | 0 |
| 15 | 0 |

Figure 9

Key 2

| Sector | TDAT 0 | 1 | 2 | 3 | 4 | 5 | 6 | 7 | HP |
|---|---|---|---|---|---|---|---|---|---|
| 0 | 2 | 3 | 2 | 2 | 2 | 2 | 2 | 2 | 1 |
| 1 | 2 | 3 | 2 | 2 | 2 | 2 | 2 | 2 | 1 |
| 2 | 2 | 3 | 2 | 2 | 2 | 2 | 2 | 2 | 1 |
| 3 | 2 | 3 | 2 | 2 | 2 | 2 | 2 | 2 | 1 |
| 4 | 3 | 0 | 2 | 2 | 2 | 2 | 2 | 2 | 3 |
| 5 | 3 | 0 | 2 | 2 | 2 | 2 | 2 | 2 | 3 |
| 6 | 3 | 0 | 2 | 2 | 2 | 2 | 2 | 2 | 3 |
| 7 | 3 | 0 | 2 | 2 | 2 | 2 | 2 | 2 | 3 |
| 8 | 0 | 1 | 2 | 2 | 2 | 2 | 2 | 2 | 1 |
| 9 | 0 | 1 | 2 | 2 | 2 | 2 | 2 | 2 | 1 |
| 10 | 0 | 1 | 2 | 2 | 2 | 2 | 2 | 2 | 1 |
| 11 | 0 | 1 | 2 | 2 | 2 | 2 | 2 | 2 | 1 |
| 12 | 1 | 2 | 2 | 2 | 2 | 2 | 2 | 2 | 3 |
| 13 | 1 | 2 | 2 | 2 | 2 | 2 | 2 | 2 | 3 |
| 14 | 1 | 2 | 2 | 2 | 2 | 2 | 2 | 2 | 3 |
| 15 | 1 | 2 | 3 | 2 | 2 | 2 | 3 | 2 | 3 |

| Spec Diag DP Sector | 2 |
|---|---|
| 0 |   |
| 1 | 1 |
| 2 | 1 |
| 3 | 1 |
| 4 | 1 |
| 5 | 1 |
| 6 | 3 |
| 7 | 3 |
| 8 | 1 |
| 9 | 2 |
| 10 | 3 |
| 11 | 3 |
| 12 | 3 |
| 13 | 2 |
| 14 | 1 |
| 15 | 1 |

Figure 10

| Spec Diag DP Sector | 3 |
|---|---|
| 0 | 3 |
| 1 | 3 |
| 2 | 3 |
| 3 | 3 |
| 4 | 1 |
| 5 | 1 |
| 6 | 2 |
| 7 | 3 |
| 8 | 0 |
| 9 | 0 |
| 10 | 0 |
| 11 | 3 |
| 12 | 2 |
| 13 | 2 |
| 14 | 2 |
| 15 | 2 |

Key 3

| Sector | TDAT 0 | 1 | 2 | 3 | 4 | 5 | 6 | 7 | HP |
|---|---|---|---|---|---|---|---|---|---|
| 0 | 3 | 0 | 3 | 3 | 3 | 3 | 3 | 3 | 3 |
| 1 | 3 | 0 | 3 | 3 | 3 | 3 | 3 | 3 | 3 |
| 2 | 3 | 0 | 3 | 3 | 3 | 3 | 3 | 3 | 3 |
| 3 | 3 | 0 | 3 | 3 | 3 | 3 | 3 | 3 | 3 |
| 4 | 0 | 1 | 3 | 3 | 3 | 3 | 3 | 3 | 1 |
| 5 | 0 | 1 | 3 | 3 | 3 | 3 | 3 | 3 | 1 |
| 6 | 0 | 1 | 3 | 3 | 3 | 3 | 3 | 3 | 1 |
| 7 | 0 | 1 | 3 | 3 | 3 | 3 | 3 | 3 | 1 |
| 8 | 1 | 2 | 3 | 3 | 3 | 3 | 3 | 3 | 3 |
| 9 | 1 | 2 | 3 | 3 | 3 | 3 | 3 | 3 | 3 |
| 10 | 1 | 2 | 3 | 3 | 3 | 3 | 3 | 3 | 3 |
| 11 | 1 | 3 | 3 | 3 | 3 | 3 | 3 | 3 | 1 |
| 12 | 2 | 3 | 3 | 3 | 3 | 3 | 3 | 3 | 1 |
| 13 | 2 | 3 | 3 | 3 | 3 | 3 | 3 | 3 | 1 |
| 14 | 2 | 3 | 3 | 3 | 3 | 3 | 3 | 3 | 1 |
| 15 | 2 | 3 | 0 | 3 | 3 | 3 | 0 | 3 | 1 |

Figure 11

METADATA PATTERN TO DETECT WRITE LOSS/INCONSISTENCIES OF OPTIMIZED-WRITE-ONCE OPERATIONS

TECHNICAL FIELD

The subject matter of this disclosure is generally related to data storage systems and more particularly to detection of lost writes and inconsistencies.

BACKGROUND

Data storage systems such as storage area networks (SANs) and network-attached storage (NAS) are used to maintain large data sets and contemporaneously support many users. Such data storage systems may implement a variety of features to maintain data integrity and data availability while protecting against data loss. Data integrity is the accuracy and consistency of data. Maintaining data integrity may include detection and correction of data corruption. Data corruption can occur for a variety of reasons. Data storage systems typically include networked computing nodes that manage arrays of drives such as hard disk drives (HDDs) and solid-state drives (SSDs) that may experience uncorrectable data errors due to bit flips and sector failures. Data storage systems are generally tolerant of such errors because error detection and correction codes (EDAC) and other features may be used to detect and correct the errors. However, some data errors, such as lost writes, are resistant to detection by features designed to detect bit flips and sector failures.

SUMMARY

All examples, aspects and features mentioned in this document can be combined in any technically possible way.

Some implementations comprise: defining a plurality of sector signature patterns; embedding a first one of the sector signature patterns with a slice of data; separately storing a metadata record indicative of the sector signature pattern embedded with the slice of data; and responsive to a read to the slice of data: performing a data integrity check using the embedded sector signature pattern and the metadata record. Some implementations comprise, responsive to a write to the slice of data, selecting a second one of the sector signature patterns and replacing the embedded sector signature pattern by embedding the second one of the sector signature patterns with the slice of data as updated by the write. Some implementations comprise defining the plurality of sector signature patterns with an algorithm. Some implementations comprise defining the plurality of sector signature patterns with horizontal parity values. Some implementations comprise defining the plurality of sector signature patterns with an order in which each sector signature and each horizontal parity value changes when a next sector signature pattern in the order is selected and embedded. Some implementations comprise defining the plurality of sector signature patterns with diagonal parity values. Some implementations comprise defining the plurality of sector signature patterns with an order in which each sector signature and each horizontal parity value and each diagonal parity value changes when a next sector signature pattern in the order is selected and embedded. In some implementations separately storing the metadata record indicative of the sector signature pattern embedded with the slice of data comprises storing a key. In some implementations performing the data integrity check using the embedded sector signature pattern and the metadata record comprises performing a pattern-to-key lookup.

Some implementations comprise: a storage system comprising a plurality of computing nodes and managed drives, at least one of the computing nodes comprising a sector signature transition controller comprising: transition logic that embeds a first one of a plurality of sector signature patterns with a slice of data and separately stores a metadata record indicative of the sector signature pattern embedded with the slice of data; and integrity check logic responsive to a read to the slice of data to perform a data integrity check using the embedded sector signature pattern and the metadata record. In some implementations the transition logic is responsive to a write to the slice of data to select a second one of the sector signature patterns and replace the embedded sector signature pattern by embedding the second one of the sector signature patterns with the slice of data as updated by a write. In some implementations an algorithm calculates the plurality of sector signature patterns. In some implementations the sector signature patterns comprise horizontal parity values. In some implementations the plurality of sector signature patterns comprises an order in which each sector signature and each horizontal parity value changes when a next sector signature pattern in the order is selected and embedded. In some implementations the sector signature patterns comprise diagonal parity values. In some implementations the plurality of sector signature patterns comprises an order in which each sector signature and each horizontal parity value and each diagonal parity value changes when a next sector signature pattern in the order is selected and embedded. In some implementations the metadata record indicative of the sector signature pattern embedded with the slice of data comprises a key. In some implementations the integrity check logic performs a pattern-to-key lookup.

Some implementations comprise a computer-readable storage medium storing instructions that when executed by a computer cause the computer to perform a method for using a computer system to perform a data integrity check, the method comprising: defining a plurality of ordered sector signature patterns comprising sector signature parity; embedding a first one of the sector signature patterns with a slice of data; separately storing a key indicative of the sector signature pattern embedded with the slice of data; and responsive to a read to the slice of data: performing a data integrity check using the embedded sector signature pattern and the metadata record. In some implementations the method further comprises, responsive to a write to the slice of data, selecting a second one of the sector signature patterns and replacing the embedded sector signature pattern by embedding the second one of the sector signature patterns with the slice of data as updated by the write.

Other aspects, features, and implementations may become apparent in view of the detailed description and figures.

BRIEF DESCRIPTION OF THE FIGURES

FIGS. 5A, 5B, 6A, and 6B illustrate four sector signature patterns including horizontal parity.

FIG. 7 illustrates horizontal and diagonal parity.

FIGS. 8 through 11 illustrate sector signature patterns including horizontal and diagonal parity.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Aspects of the inventive concepts are described as being implemented in a data storage system that includes host servers and a storage area network (SAN), which may also be referred to as a storage array. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
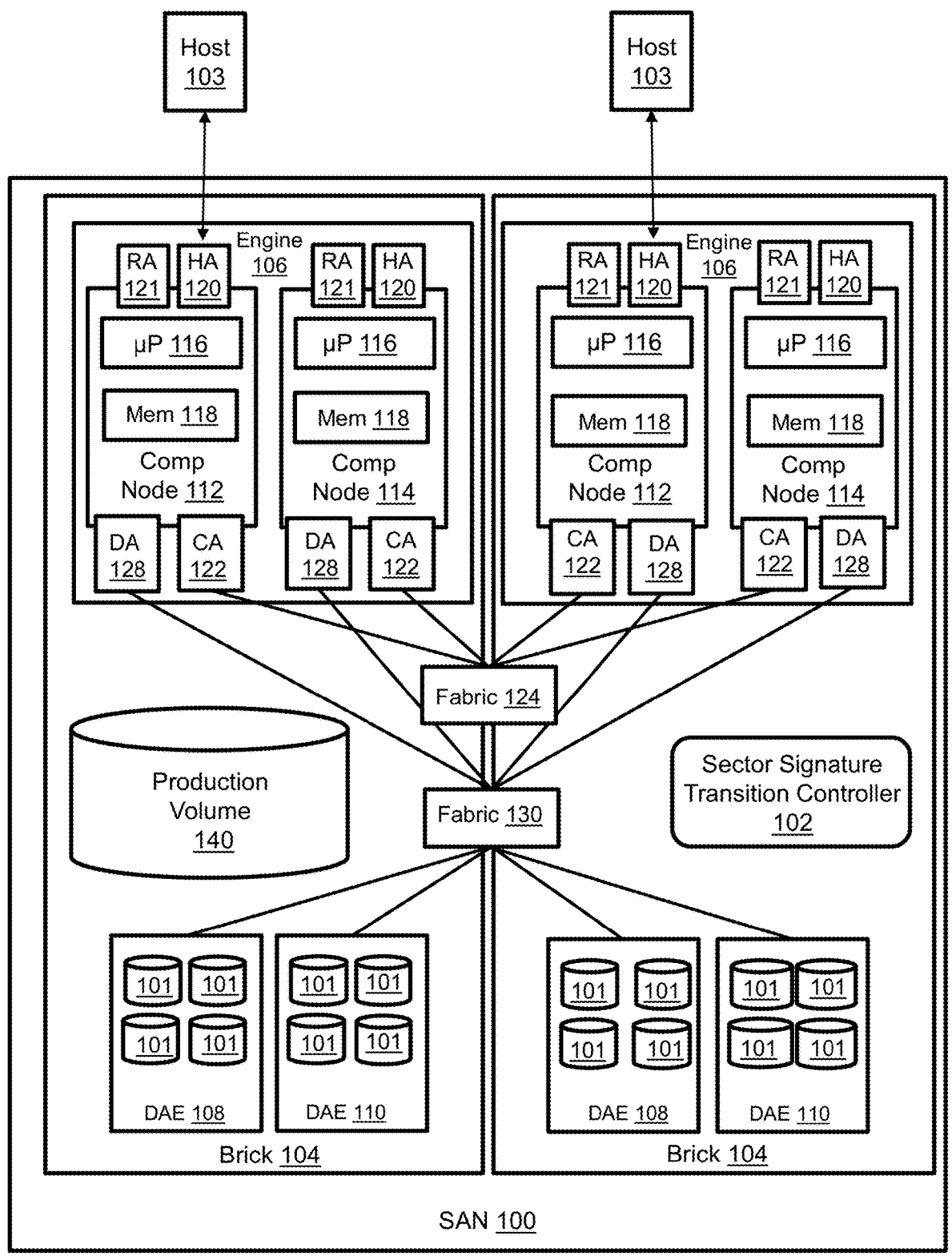
FIG. 1 illustrates a SAN with a sector signature transition controller.

FIG. 1 illustrates a SAN 100 with a sector signature transition controller 102. As will be explained in greater detail below, the sector signature transition controller 102 applies predetermined sector signature patterns to slices of data storage to maintain data integrity. The SAN is depicted in a simplified data center environment that includes two hosts 103. The hosts may be server computers that include volatile memory, non-volatile storage, one or more tangible processors, and a hypervisor or containers. Instances of applications (host applications) running on each host use data that is maintained by the SAN. Examples of host applications may include email programs, inventory control programs, and accounting programs, for example and without limitation.

The SAN 100 includes one or more bricks 104. Each brick includes an engine 106 and one or more drive array enclosures (DAEs) 108, 110. Each DAE includes managed drives 101 which are non-volatile media such as, without limitation, solid-state drives (SSDs) based on EEPROM technology such as NAND and NOR flash memory and hard disk drives (HDDs) with spinning disk storage media. Drive controllers may be associated with the managed drives as is known in the art. Each engine 106 includes a pair of interconnected computing nodes 112, 114, which may be referred to as "storage directors." Each computing node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each computing node includes one or more host adapters (HAs) 120 for communicating with the hosts 103. Each host adapter has resources for servicing input-output commands (IOs) from the hosts. The resources may include processors, volatile memory, and ports via which the hosts may access the SAN. Each computing node also includes a remote adapter (RA) 121 for communicating with other storage systems. Each computing node also includes one or more drive adapters (DAs) 128 for communicating with the managed drives 101 in the DAEs 108, 110. Each drive adapter has processors, volatile memory, and ports via which the computing node may access the DAEs for servicing IOs. Each computing node may also include one or more channel adapters (CAs) 122 for communicating with other computing nodes via an interconnecting fabric 124. The paired computing nodes 112, 114 of each engine 106 provide failover protection and may be directly interconnected by communication links. An interconnecting fabric 130 enables implementation of an N-way active-active backend. A backend connection group includes all drive adapters that can access the same drive or drives. In some implementations every drive adapter 128 in the SAN can reach every DAE via the fabric 130. Further, in some implementations every drive adapter in the SAN can access every managed drive 101 in the SAN.

Data associated with the hosted application instances running on the hosts 103 is maintained on the managed drives 101. The managed drives 101 are not discoverable by the hosts 103 but the SAN 100 creates a production volume 140 that can be discovered and accessed by the hosts. The production volume is a logical storage device that may be referred to as a source device, production device, or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101. Metadata that maps between the LBAs and addresses in shared memory and the managed drives is maintained by the computing nodes.

Figure 2:
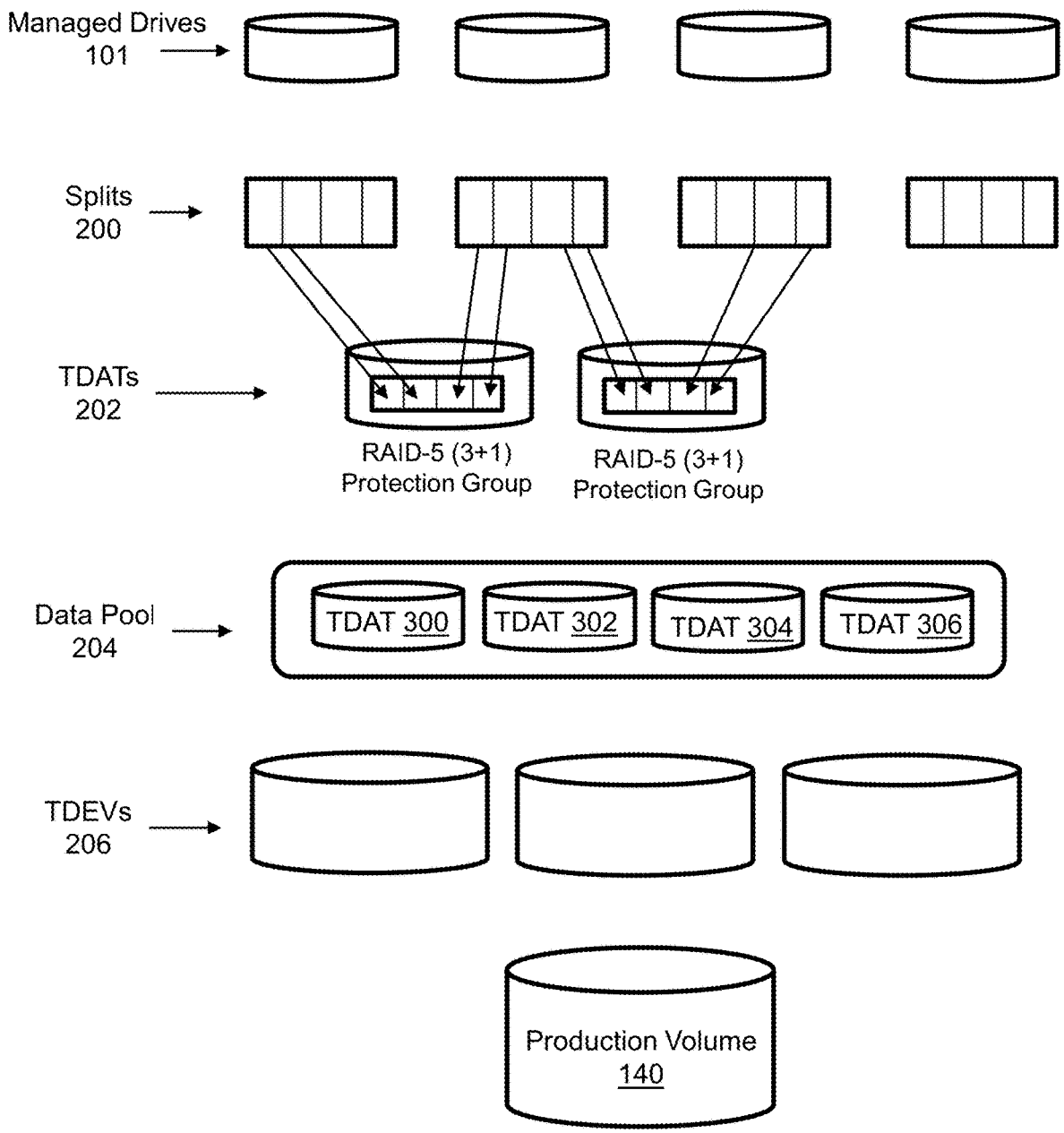
FIG. 2 illustrates various layers of abstraction between the managed drives and the production volume.

FIG. 2 illustrates various layers of abstraction between the managed drives 101 and the production volume 140. The managed drives 101 are each organized as a plurality of logical splits 200 of equal capacity. Each split includes a contiguous range of logical addresses such as LBAs. The storage capacity of a single split is a design implementation but, for context and without limitation, may be some fraction or percentage of the capacity of a managed drive equal to an integer multiple of sectors greater than 1. A sector may be the smallest unit of storage that a managed drive processes so a sector may be provided in response to a sub-sector-sized read and a sector may be overwritten in response to a sub-sector-sized write. The size of 1 sector is an implementation detail but may be, for example and without limitation, 8192 bytes. The size of 1 block is also an implementation detail but may be, for example and without limitation, 8 sectors. Groups of splits from multiple managed drives are used to create data devices (TDATs) 202. More particularly, the splits on each TDAT are organized as members of a RAID protection group. RAID-5 (3+1) protection groups are shown in the illustrated example. A data pool 204, also known as a thin pool, is a collection of TDATs 202 of the same emulation and RAID protection type. In some implementations all TDATs in a drive group are of a single RAID protection type and all are the same size (capacity). Logical thin devices (TDEVs) 206 are created with the TDATs. The logical production volume 140 is created from TDEVs 206.

In order to maintain data integrity, the sector signature transition controller 102 (FIG. 1) assigns signatures to the sectors or blocks of a parity group such as a split (or same-sized slices of a different size than splits). The signatures, hereafter referred to as "sector signatures," include a "version" ID that is embedded with the data stored on the splits. For example, each version ID may be a two-bit embedded sector signature (ESS) value that is changed each time the corresponding sector data is changed. Separate metadata, e.g. in the shared memory, includes information (sector signature metadata (SS MD)) for comparison with the embedded sector signatures as part of a data integrity check. For example, the SS MD may include the sector signature value, a CRC, LBAs, and volume ID.

Figure 3:
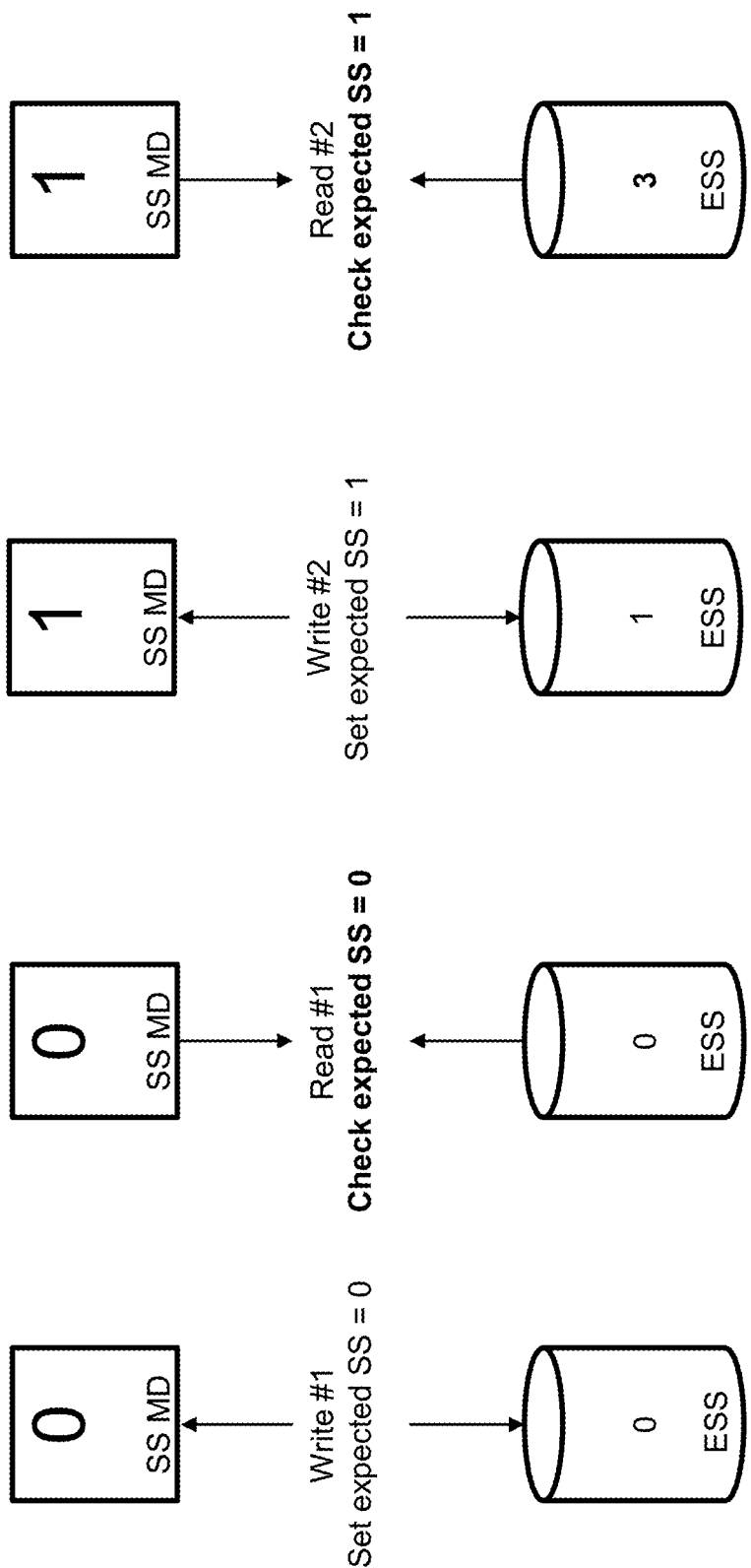
FIG. 3 illustrates use of sector signatures to detect a data integrity error.

FIG. 3 illustrates use of sector signatures to detect a data integrity error. When a first write (Write #1) occurs the sector signature is set to version 0. Consequently, the SS MD and ESS values are both set to 0. When a first read (Read #1) occurs the ESS is compared with the SS MD and the matching 0 values indicate data integrity. When a second write (Write #2) occurs the sector signature version is changed to 1 so the ESS and SS MD values are both set to 1. When a second read (Read #2) occurs the ESS is compared with the SS MD and mismatching values (SS MD=1, ESS=3) indicate loss of data integrity. Specifically, because the ESS value 3 fails to match the SS MD value 1 corruption of the sector data is indicated. The sector data may then be recovered using any of a wide variety of features. Although this process of comparing individual ESS and SS MD values is effective for independently checking each sector in a slice for loss of data integrity, it can be computationally burdensome due to the number of values that require individual management.

Figure 4:
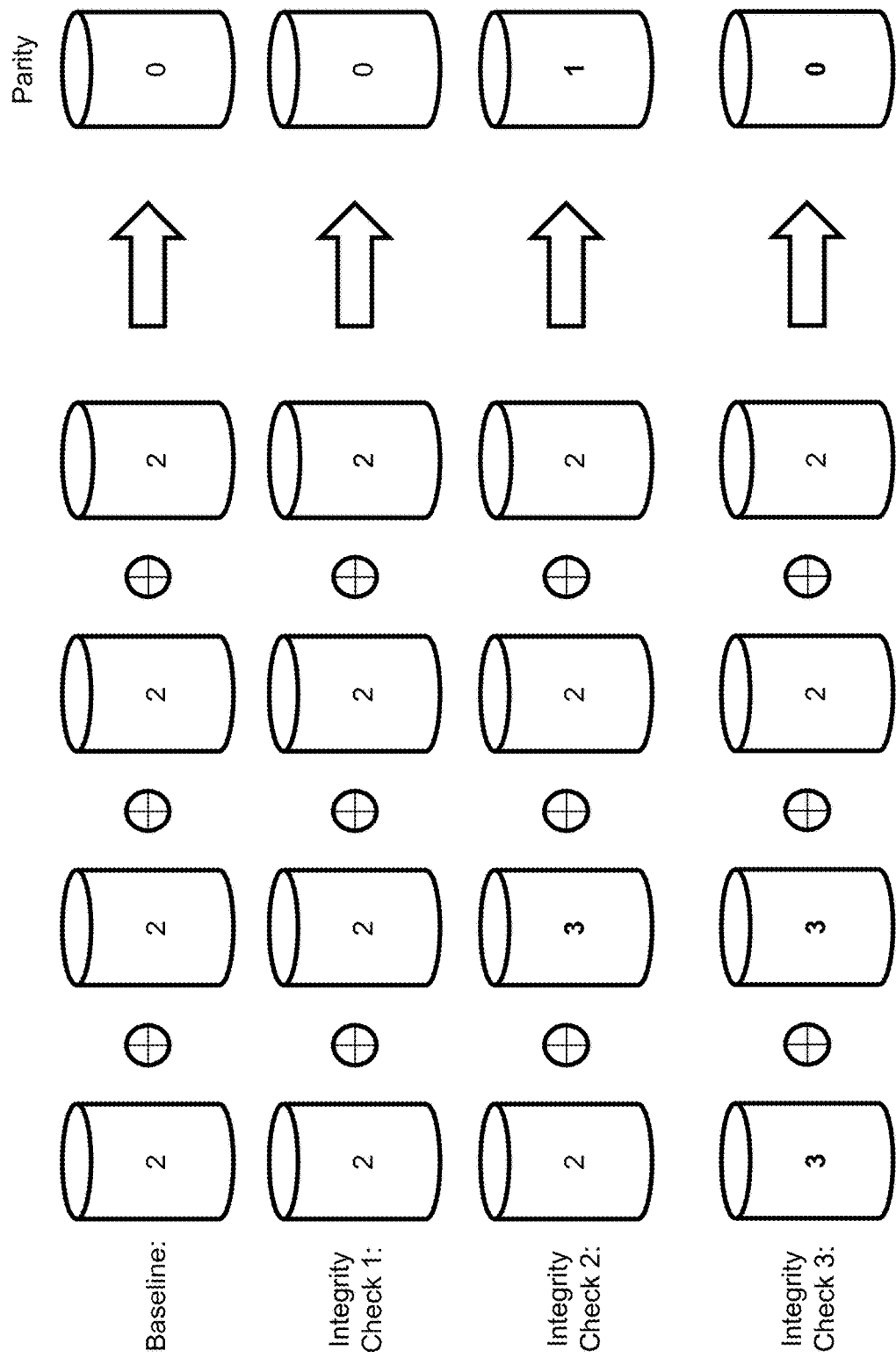
FIG. 4 illustrates use of sector signature parity to detect a data integrity error.

FIG. 4 illustrates use of sector signature parity to more efficiently detect a data integrity error. A group of sectors of a split or slice are organized into a parity group. A sector parity value is calculated for the parity group as the bitwise XOR (or some other function) of the sector signatures of the parity group members. For example, each sector of the illustrated parity group in the baseline case initially has a sector signature value of 2, which yields a sector signature parity value of 0. The sector signature values are stored as embedded values (ESSs) and separate metadata values (MD SSs). The sector parity values are stored as separate metadata values, e.g. integrated or associated with the MD SSs.

A data integrity check is performed by calculating a sector parity value and comparing the metadata sector parity value with the calculated sector parity value. For example, in integrity check 1 the calculated sector parity value of 0 matches the previously stored metadata sector parity value of 0, which indicates data integrity for all parity group members. If, as a result of data corruption, the sector signature value of one of the sectors becomes 3 as indicated in integrity check 2, the calculated sector parity value is 1. The calculated sector parity value of 1 fails to match the metadata sector parity value of 0, which indicates loss of data integrity. Individual ESS and MD SS values for the sectors can then be compared to determine which sectors require correction. Advantageously, the data integrity check that does not indicate loss of integrity is completed without comparing the ESS and MD SS values of each and every parity group member. The XOR calculations are not computationally burdensome so the integrity check is efficient even as the number of sectors in the parity group is scaled up. However, although such parity-based data integrity checks enhance efficiency, corruption of multiple sectors can create a misleading parity value match. For example, if, as a result of data corruption, the sector signature values of two of the sectors becomes 3 as indicated in integrity check 3, then the calculated sector parity value is 0. The calculated sector parity value of 0 matches the metadata sector parity value of 0, which incorrectly indicates data integrity.

One way to avoid false indications of data integrity is to manage sector signature assignment and transition collectively. Rather than individually incrementing each embedded sector signature value, all sector signature values are set to values corresponding to a predetermined pattern. More specifically, multiple patterns are predetermined, and all sector signature values are updated by transitioning to a different pattern. Corresponding pattern keys are maintained separately as part of the metadata. Key-to-pattern mappings enable the transition controller to efficiently determine an expected pattern from a key to perform a data integrity check. The patterns are selected such that every sector signature within the pattern changes each time a different pattern is used on the same parity group, split or slice. The pattern may further be selected such that the parity values change each time a different parity group is used. In some implementations a new pattern is used only when the entire slice is written. Individual sector signature may be updated for sub-slice writes. In other implementations a new pattern is used for every write.

FIGS. 5A, 5B, 6A, and 6B illustrate four sector signature patterns including horizontal parity (HP). The patterns are sized 16 sectors deep and 8 TDATs wide plus a HP value. The HP value is calculated as the bitwise XOR of the sector signature values of the same sector (thus "horizontal") of the TDATs. The patterns of FIGS. 5A, 5B, 6A, and 6B correspond respectively to keys 0, 1, 2, and 3. Transitioning between any two of the patterns results in every sector signature value changing. However, in order to assure that the HP values also change the patterns may be selected cyclically in order, e.g. key 0 to key 1 to key 2 to key 3 to key 0, to key 1, etc.

FIG. 7 illustrates sector signatures with horizontal parity (HP) and diagonal parity (DP). For implementations in which the number of sector signature in a horizontal protection group is even, e.g. for RAID levels having an even number of data members, the HP values are calculated as the bitwise XOR of the sector signature values of the same sector as described above. If there were an odd number of data members, then a simple XOR of the same pattern value in each cell would generate a different horizontal parity write on each update. The DP values are calculated using an even-odd model such as described in M. Blaum, J. Brady, J.

Bruck and Jai Menon, "EVENODD: an efficient scheme for tolerating double disk failures in RAID architectures," in *IEEE Transactions on Computers*, vol. 44, no. 2, pp. 192-202, February 1995, which is incorporated by reference.

FIGS. 8 through 11 illustrate sector signature patterns including horizontal and diagonal parity. The patterns of FIGS. 8, 9, 10, and 11 correspond respectively to keys 0, 1, 2, and 3. Transitioning between the patterns cyclically in order (e.g., key 0 to key 1 to key 2 to key 3 to key 0, to key 1, etc.) results in every sector signature value, HP value, and DP value changing each time the pattern is changed. Linkage key incremental changes change the ESS and sector parity "disk metadata" even if the disk data does not change, including the (RAID-5, RAID-6) HP data and the (RAID-6) DP data. The key-to-pattern lookup is utilized to generate the embedded disk metadata for the data being written. A pattern-to-key lookup is utilized during recovery. If no matching key is found, then the data is considered inconsistent even if the data XORs into parity properly. Fewer or greater than four patterns might be used.

A sector signature generation algorithm for full slice writes with even-numbered RAID data member widths is described below.

Figure 12:
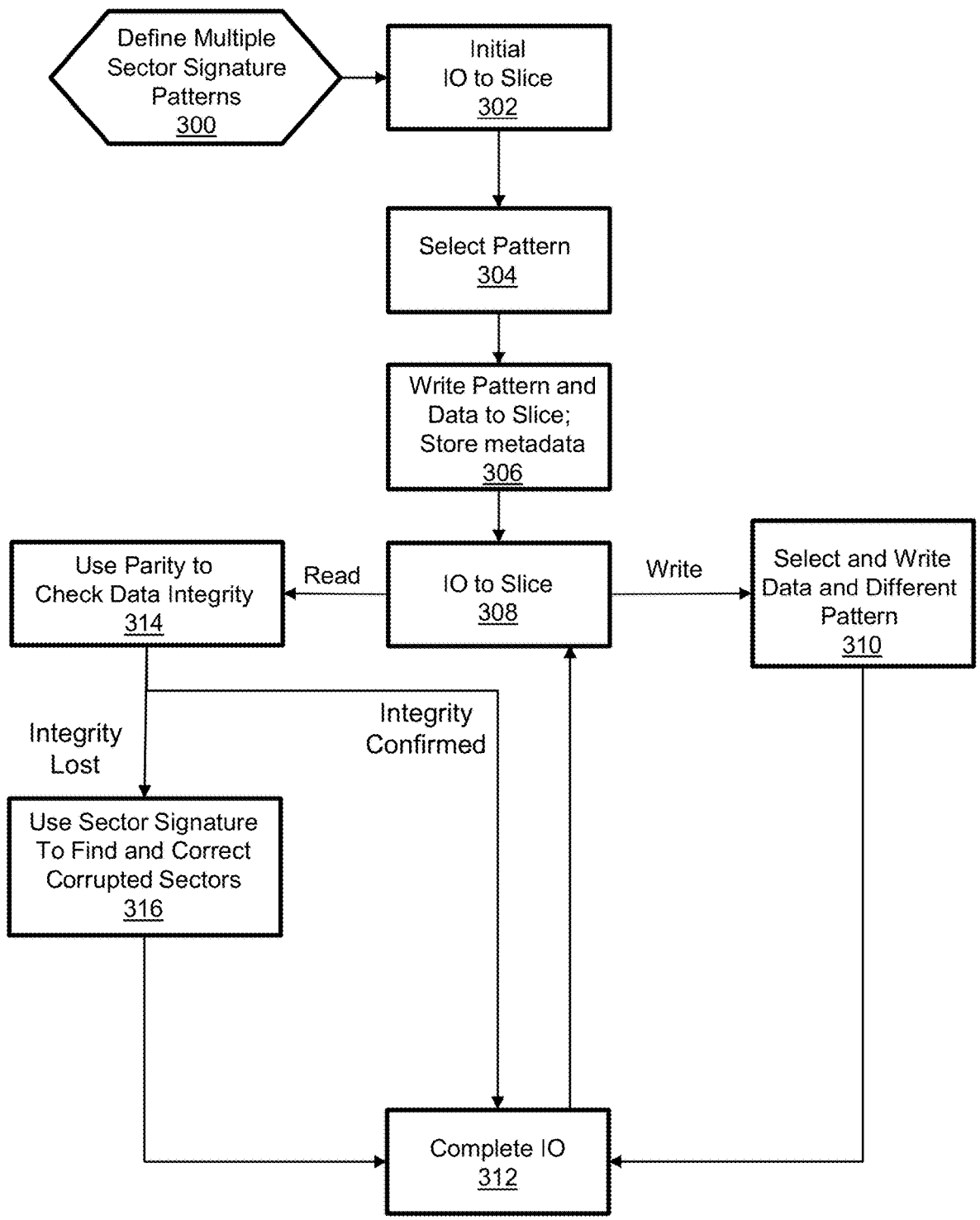
FIG. 12 illustrates operation of the sector signature transition controller in greater detail.

Algorithm parameters:
W=RAID width (e.g. for an 8+2 RAID group W=8)
Sector count (number of 8 KB sectors in a data member in one slice)
SV=Slice version number (the single SS value used to generate the SS for each member and sector in the slice)
SB=number of bits in SS
Calculate:
SSMax=(2^SB)
Variables:
M=RAID data member number, range=0 . . . W−1
S=sector (i.e. 8 KB chunk of user data space), range= 0 . . . SC−1
The sector signature value for a given member and sector SS(M, S) is then defined as:
if (M<=1) then SS(M, S):=(M+SV+(idiv(S, (2^SB)))) mod SSMax
if W<=(SSMax) then
SS(M, S):=SV
if SSMax<W<=(2^(SB+1)) then
if (S=(SC−1)) and (M=2 or M=2+SSMax) then SS(M, S):=(SV+1) mod SSMax
else SS(M, S):=SV
if (2^(SB+1))<W<=(2^(SB+2)) then
if (S=(SC−1)) and (M=2 or M=2+SSMax) then SS(M, S):=(SV+1) mod SSMax
else if (S=2) and (M=2+SSMax or M=2+(2*SSMax)) then SS(M, S):=(SV+1) mod SSMax
else SS(M, S):=SV FIG. 12 illustrates operation of the sector signature transition controller in greater detail. In a preparatory step 300 multiple sector signature patterns are defined for slices. This may include storing patterns of one or more of sector signature values, horizontal parity values, and diagonal parity values. Alternatively, or additionally, one or more of sector signature values, horizontal parity values, and diagonal parity values may be defined logically or mathematically, e.g. with an algorithm. When an initial IO is received to write data to the slice as indicated at step 302, a pattern is selected as indicated in step 304. The pattern and data are written to the slice and corresponding metadata is stored as indicated at step 306. For example, ESS values, HP values, and DP values may be stored with the data and the corresponding pattern key may be stored separately in the metadata.

When an IO to the slice is received as indicated in step 308, subsequent processing is dependent on the IO type. In the case of a write a different pattern is selected as indicated in step 310 and the data and pattern are written to the slice. The key-to-pattern lookup is utilized to generate the ESS, HP, and DP values. The ESS values are changed as indicated in the different pattern even if the corresponding sector data has not changed. The IO is then completed as indicated in step 312, e.g. sending an ACK, etc. Selection of a different pattern may include selecting the pattern corresponding to the next key in the incremental/cyclical order. In the case of a read the sector signature parity values are used to perform a data integrity check as indicated in step 314. If integrity is confirmed, then the IO is completed as indicated in step 312. If integrity is lost, then the embedded sector signatures are used to find and correct corrupted sectors as indicated in step 316 so the IO can be completed as indicated in step 312. A pattern-to-key lookup is utilized during recovery. If no matching key is found, then the data is considered inconsistent even if the data XORs into parity properly. Subsequent IOs to the slice are similarly processed beginning back at step 308.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
   independently from stored data values, defining a plurality of sector signature patterns;
   embedding a first one of the sector signature patterns with data stored on a slice of non-volatile storage;
   separately storing a metadata record in memory indicative of the sector signature pattern embedded with the data; and
   responsive to a read to the slice on which the data is stored:
   performing a data integrity check using the embedded sector signature pattern and the metadata record.

2. The method of claim 1 comprising, responsive to a write to the slice, selecting a second one of the sector signature patterns and replacing the embedded sector signature pattern by embedding the second one of the sector signature patterns with the data stored on the slice as updated by the write.

3. The method of claim 1 comprising defining the plurality of sector signature patterns with an algorithm.

4. The method of claim 1 comprising defining the plurality of sector signature patterns with horizontal parity values.

5. The method of claim 4 comprising defining the plurality of sector signature patterns with an order in which each sector signature pattern and each horizontal parity value changes when a next sector signature pattern in the order is selected and embedded.

6. The method of claim 4 comprising defining the plurality of sector signature patterns with diagonal parity values.

7. The method of claim 6 comprising defining the plurality of sector signature patterns with an order in which each sector signature pattern and each horizontal parity value and each diagonal parity value changes when a next sector signature pattern in the order is selected and embedded.

8. The method of claim 1 wherein separately storing the metadata record indicative of the sector signature pattern embedded with the data comprises storing a key.

9. The method of claim 8 wherein performing the data integrity check using the embedded sector signature pattern and the metadata record comprises performing a pattern-to-key lookup.

10. An apparatus, comprising:
a storage system comprising a plurality of computing nodes and managed drives, at least one of the computing nodes comprising a sector signature transition controller comprising:
transition logic that embeds a first one of a plurality of sector signature patterns with a slice of data stored on the managed drives and separately stores a metadata record in memory indicative of the sector signature pattern embedded with the slice of data, wherein the sector signature patterns are defined independently from stored data values; and
integrity check logic responsive to a read to the slice of data to perform a data integrity check using the embedded sector signature pattern and the metadata record.

11. The apparatus of claim 10 wherein the transition logic is responsive to a write to the slice of data to select a second one of the sector signature patterns and replace the embedded sector signature pattern by embedding the second one of the sector signature patterns with the slice of data as updated by a write.

12. The apparatus of claim 10 comprising an algorithm that calculates the plurality of sector signature patterns.

13. The apparatus of claim 10 wherein the sector signature patterns comprise horizontal parity values.

14. The apparatus of claim 13 wherein the plurality of sector signature patterns comprises an order in which each sector signature pattern and each horizontal parity value changes when a next sector signature pattern in the order is selected and embedded.

15. The apparatus of claim 13 wherein the sector signature patterns comprise diagonal parity values.

16. The apparatus of claim 15 wherein the plurality of sector signature patterns comprises an order in which each sector signature pattern and each horizontal parity value and each diagonal parity value changes when a next sector signature pattern in the order is selected and embedded.

17. The apparatus of claim 10 wherein the metadata record indicative of the sector signature pattern embedded with the slice of data comprises a key.

18. The apparatus of claim 17 wherein the integrity check logic performs a pattern-to-key lookup.

19. A non-transitory computer-readable storage medium storing instructions that when executed by a computer cause the computer to perform a method for using a computer system to perform a data integrity check, the method comprising:
independently from stored data values, defining a plurality of ordered sector signature patterns comprising sector signature parity;
embedding a first one of the sector signature patterns with a slice of data in non-volatile storage;
separately storing a key in memory indicative of the sector signature pattern embedded with the slice of data; and
responsive to a read to the slice of data:
performing a data integrity check using the embedded sector signature pattern and the key.

20. The non-transitory computer-readable storage medium of claim 19 wherein the method further comprises, responsive to a write to the slice of data, selecting a second one of the sector signature patterns and replacing the embedded sector signature pattern by embedding the second one of the sector signature patterns with the slice of data as updated by the write.

* * * * *